(No Model.)

C. S. MURKLAND.
SHAFT CONNECTION.

No. 597,506. Patented Jan. 18, 1898.

Witnesses
Emile H. Tardivel.
Tracy C. Ford.

Inventor
Charles S. Murkland
By his Attorney J. B. Thurston

UNITED STATES PATENT OFFICE.

CHARLES SUMNER MURKLAND, OF DURHAM, NEW HAMPSHIRE.

SHAFT CONNECTION.

SPECIFICATION forming part of Letters Patent No. 597,506, dated January 18, 1898.

Application filed November 23, 1896. Serial No. 613,104. (No model.)

*To all whom it may concern:*

Be it known that I, CHARLES SUMNER MURKLAND, a citizen of the United States, residing at Durham, in the State of New Hampshire, have invented certain new and useful Improvements in Shaft Connections; and I do hereby declare the following to be a full, clear, and exact description of the invention, such as will enable others skilled in the art to which it appertains to make and use the same.

This invention obviates the necessity of beveled gearing for connecting and driving shafting which may require to be hung at an angle and accomplishes a great saving of power over that required to drive bevel-gears in reducing friction to a minimum, the object being to economize power in driving shafting when connected at an angle by equalizing the variations in angular velocity.

To this end my invention consists, broadly, in equalizing the variations in angular velocity by a combination of joints of compact structure and comprising the minimum number of bearings.

A connection of this character for shafting, when made compact and with as few bearings as possible, is a great advantage over the use of bevel-gears; but with my peculiar construction the shock which, in theory as well as practice, is caused by these variations in angular velocity is practically eliminated, as fully set forth in the following specification and claims, and clearly illustrated in the accompanying drawings, forming a part of same, of which—

Figure 1:
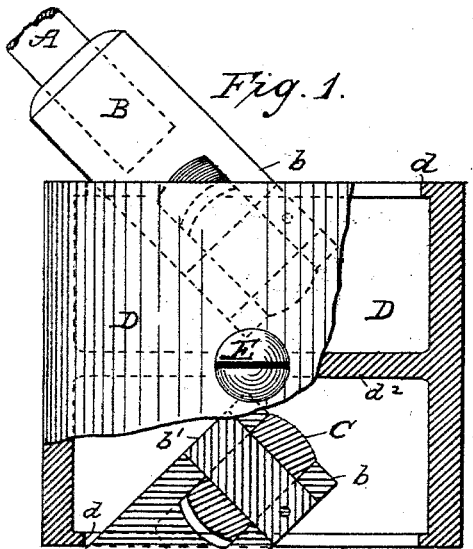
Figure 2:
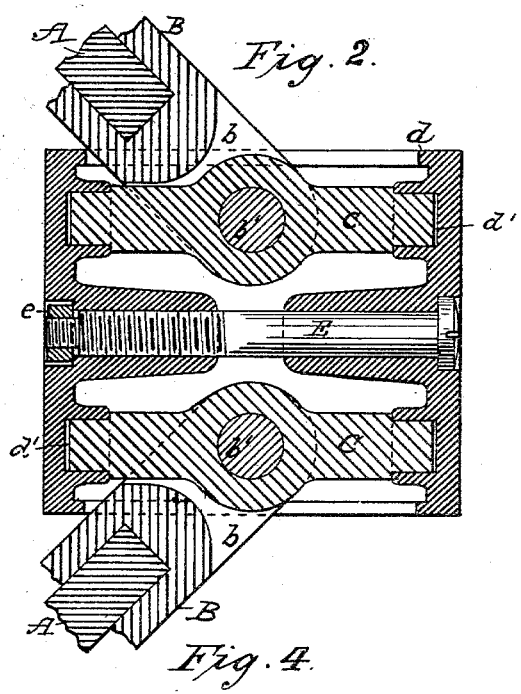
Figure 3:
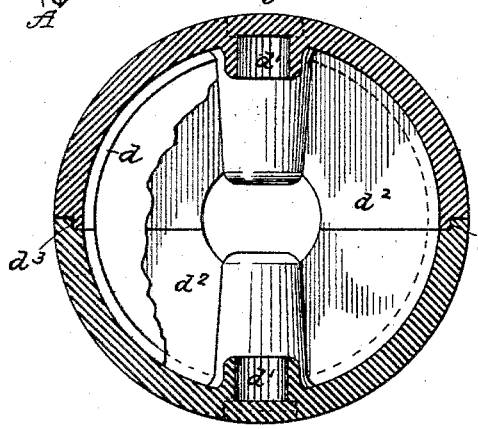
Figure 4:
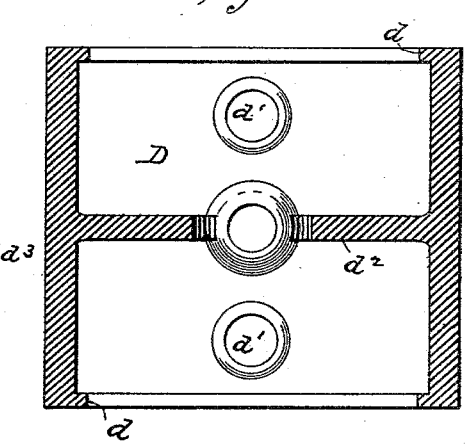

Figure 1 is a broken plan view showing two pieces of shafting placed at an angle of forty-five degrees and my improved connections. Fig. 2 is a central sectional plan view of the same as when the shafts have been turned one-quarter revolution from the position seen in Fig. 1. Fig. 3 is a vertical section of a divided cylinder forming a part of my improved shaft connection, Fig. 4 being a sectional plan of a portion of the cylinder.

Similar reference-letters designate corresponding parts in all the views.

A are portions of shafting, and B are forked sleeves, which are secured one to the end of each shaft. The forked portions $b$ of said sleeves may be of any width required to receive the bars C, and the said forks $b$ and bars C are perforated to receive the pivot-pin $b'$, by which they are movably connected. A frame of any suitable construction may be provided, within which the bars C are mounted parallel one with the other, thus connecting the ends of shafting in a manner which permits of their being placed in various positions from that of alinement to an angle of forty-five degrees.

For the purpose of cleanliness and preventing the unnecessary waste of lubricants I have adopted a cylindrical form of frame in which to mount the revolving bars C, which consists of a cylinder D, preferably cast in two parts secured together by a threaded bolt E, as shown. The cylinder D is provided at its ends with an interior annular flange $d$ for catching any lubricating-oil which might be thrown from the several moving parts of my improved shaft connection while the same is in action, and this cylindrical form of frame also serves the purpose of belt-pulley should power be desired at that point.

The pulley or cylinder D may be provided with sockets $d'$, located interiorly and at opposite sides, which serve as bearings for the ends of the revolving bars C, the sockets being preferable to perforations, as the exterior of the pulley or cylinder is thus kept free from grease or oil, which would otherwise work through the bearings of the revolving bars C.

The threaded bolt E may be passed loosely through one side or section of the pulley or cylinder and threaded to the other side or section, and then a check-nut $e$ may be threaded to the end of said bolt E, and thus prevent any possibility of the sections of said pulley becoming accidentally separated.

An interior central flange $d^2$ is formed in the pulley or cylinder D, which will serve to strengthen the same.

It will be readily seen that my improved device forms a most compact shaft connection which, as a substitute for beveled gearing, performs its function in a most economical manner, saving power by simplicity of structure, and by reducing the actual variations in angular velocity to the lowest limit.

An offset $d^3$ may be formed longitudinally in the adjacent surfaces of the shell of the pulley or cylinder for the purpose of retaining the two sections in proper relative position.

Having described my improvements, what I claim is—

1. In a shaft-coupling, the combination, with a cylindrical frame comprising two semi-cylindrical portions, the interior of each of which is provided with a hollow projection, one of which is screw-threaded, of a bolt through the projection, two parallel bars pivotally secured within the frame, and a forked sleeve pivotally secured to each bar, the outer end of which is adapted to receive the end of a shaft, substantially as set forth.

2. In a shaft-coupling, the combination, with a cylindrical frame, comprising two semi-cylindrical portions, each of which is provided with a hollow projection and two sockets, of a bolt through the hollow projection, two bars pivotally secured in the sockets upon opposite sides of the frame, and a forked sleeve upon each bar, the outer end of which is adapted to receive the end of a shaft, substantially as set forth.

3. In a shaft-coupling, the combination, with a cylindrical frame, comprising two semi-cylindrical portions, each of which is provided with a central flange, of a bolt for securing the portions together, two bars rotatably secured within the frame, and a forked sleeve pivotally secured to each bar, substantially as set forth.

In testimony whereof I affix my signature in presence of two witnesses.

CHARLES SUMNER MURKLAND.

Witnesses:
LUCIEN THOMPSON,
CHARLES W. STONE.